United States Patent [19]

Cholez et al.

[11] 3,986,162
[45] Oct. 12, 1976

[54] SYSTEM FOR THE MULTIPLEXED TRANSMISSION OF SIGNALS FROM SEISMIC RECEIVERS

[75] Inventors: Roger Cholez, La Chapelle; Raymond Bonder, Orvault; Jean-Paul Ménard, Montfaucon; Etienne Baudry, LaSequiniere, all of France

[73] Assignee: Societe d'Etudes, Recherches et Constructions Electroniques - SERCEL, Carquefou, France

[22] Filed: July 10, 1974

[21] Appl. No.: 487,189

[30] Foreign Application Priority Data
July 10, 1973 France............................ 73/25207

[52] U.S. Cl. .................... 340/15.5 TS; 179/15 AL; 179/15 AQ; 340/15.5 DP
[51] Int. Cl.² ...................... G01V 1/00; H04J 3/12
[58] Field of Search ............. 340/15.5 TS, 15.5 DP; 179/15 AL, 15 AQ

[56] References Cited
UNITED STATES PATENTS 3,652,979 3/1970 Angelle ........................ 340/15.5 TS
3,748,638 7/1973 Montgomery et al. ....... 340/15.5 DP
3,851,302 11/1974 Schmitt ...................... 340/15.5 TS

*Primary Examiner*—Maynard R. Wilbur
*Assistant Examiner*—S. C. Buczinski
*Attorney, Agent, or Firm*—Donald D. Jeffery

[57] ABSTRACT

An installation for the multiplexed transmission of signals from seismic receivers, each associated with a respective multiplexing circuit, connected in series in a transmission line between a generator of first pulse signals and a registration station. Each receiver is followed by a digitiser and each multiplexing circuit includes means allowing the first pulse signals to pass without modification, at least one shift register, capable of being filled with digital information from the associated receiver and connected in series in the transmission line, means for detecting the first pulse signals coupled upstream in the transmission line, and means for applying clock signals to the shift registers after each detection of the first pulse signal.

20 Claims, 7 Drawing Figures

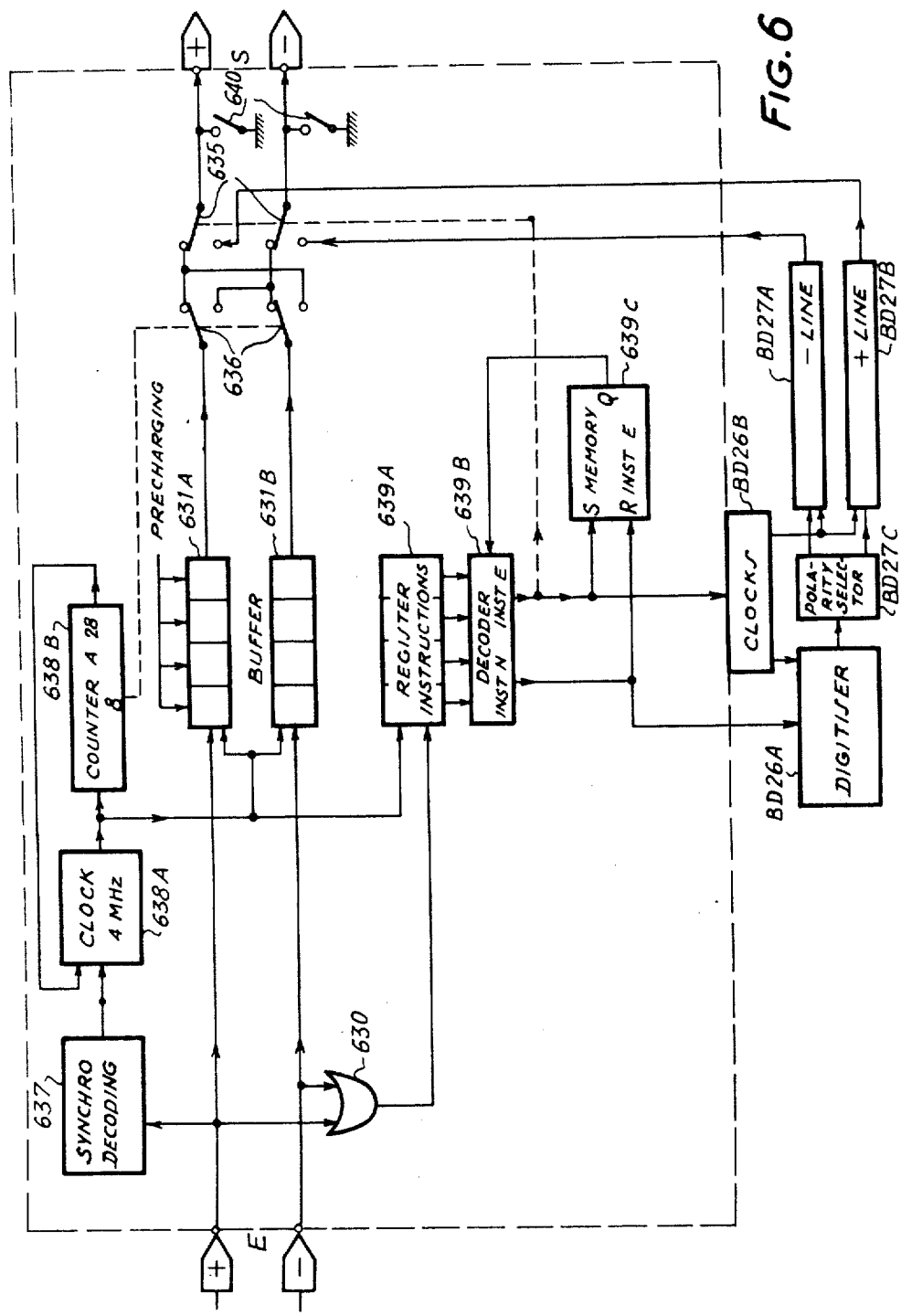

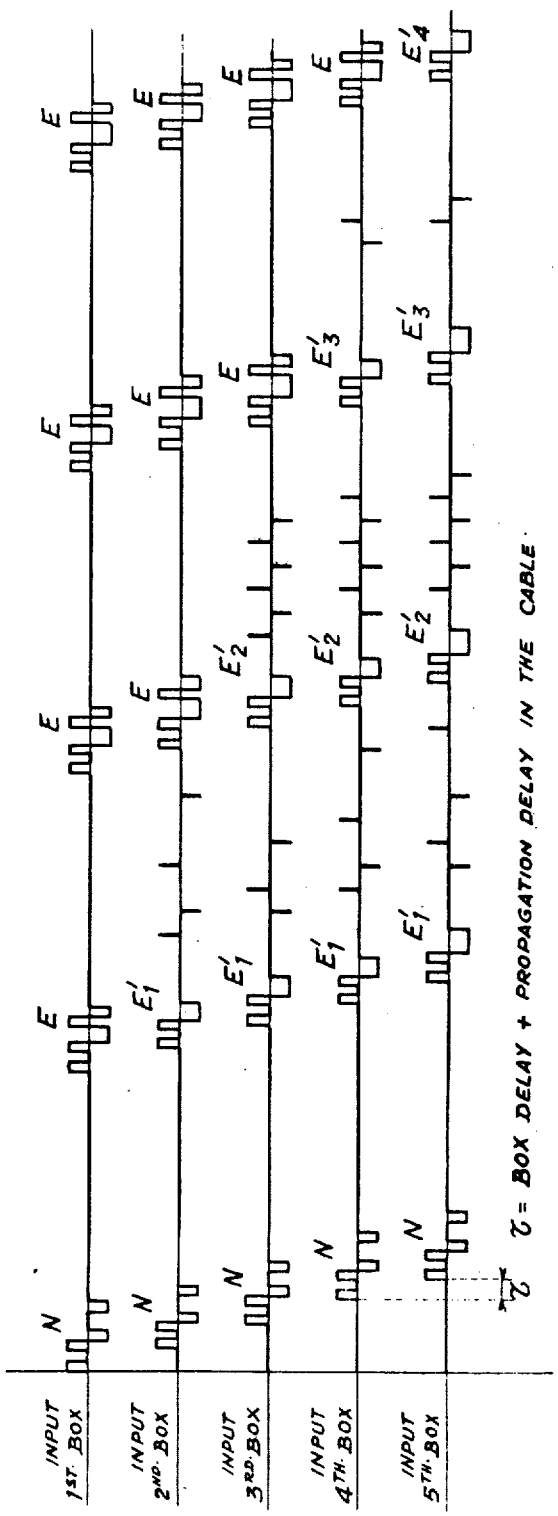

SYSTEM FOR THE MULTIPLEXED TRANSMISSION OF SIGNALS FROM SEISMIC RECEIVERS

BACKGROUND OF THE INVENTION

The present invention concerns a system for the multiplexed transmission of seismic signals provided by a plurality of receivers in digital form.

French Pat. No. 69,06,077, filed Mar. 5, 1969 and granted to the Compagnie Générale de Géophysique (corresponding to U.S. patent application Ser. No. 16,704, filed Mar. 5, 1970, now U.S. Pat. No. 3,652,979, issued Mar. 28, 1972), and its first Certification of Addition No. 70,04,447, (British patent specification No. 1,295,332), describe a system for the multiplexed transmission of seismic signals. In that system, electrical signals arising from various receivers or groups of receivers are transmitted in a time multiplexed form to a central registration unit.

The system described thus includes a seismic transmission line leading to a central registration unit and starting from a pulse generator at the end of the line. Each receiver is associated with the transmission line through a multiplexing assembly including electronic gates to make communication between the receiver and the line, and a decoding element to control the opening of the gates in response to the specific reception of pulses from the generator, in such a way that the receiver signals arrive at the central registration unit in accordance with a time multiplex sequence defined by the succession of control pulses from the generator.

In French patent application No. 72,18,138, filed on May 19, 1972 in the name of the Compagnie Générale de Géophysique (corresponding to U.S. patent application Ser. No. 361,815, filed May 18, 1973, now U.S. Pat. No. 3,911,226, issued Oct. 7, 1975), there is described an "Installation for the multiplexed transmission of seismic signals" suitable for use with digital signals, (British patent application No. 23886/73). Each receiver then furnishes the information received by it in digital form to a multiplexing circuit mounted in series with the line.

The multiplexing circuit includes at least one shift register capable, on the one hand, of being filled by this digital information, and on the other hand, of being coupled operatively to the transmission line downsteam so as to apply the digital information in the form of successively coded pulses.

The generator emits first pulse signals which are recognisable with respect to the digital information; in each multiplexing circuit means for detecting these first pulse signals are coupled upstream in the transmission line, clock pulses being applied to the shift register after the detection of a first pulse signal.

In this previous Application, the means for applying the clock pulses to the shift register included preferably a source of clock pulses and means responsive to the detection of the first pulse signal to cause a predetermined number of clock pulses to be applied to the shift register from said source.

SUMMARY OF THE INVENTION

The present invention concerns a new system for the multiplexed transmission of digital seismic signals.

While the above-mentioned Application No. 72,18,138 essentially describes a multiplexed transmission in which seismic signals pass without temporary storage, the present invention proposes a system in which digital information is stored in each multiplexing circuit and is progressively shifted all along the transmission line, which thus acts as a vast shift register.

In accordance with this invention in a system for multiplexed transmission each multiplexing circuit includes:
means for passing the first pulse signals without modification,
at least one shift register, capable of being filled with the digital information in the form of successively coded pulses,
means for the detection of the first pulse signals, coupled upstream on the transmission line, and
means for applying clock pulses to the shift register after each detection of a first pulse signal.

Preferably, the generator periodically emits a second pulse signal, different from the first pulse signals, and each multiplexing circuit includes another shift register to contain the digital information of the receiver, and means responsive to the detection of the second pulse signal to couple said other shift register downstream on the transmission line so as to apply the digital information there in the form of successively coded pulses, and, to apply a predetermined number of clock pulses to said other shift register.

In a variant related to a structure described in the abovementioned Application No. 72,18,138, the generator and the recording device form a central unit; the transmission line forms a loop starting from the central unit and returning to it, traversing each multiplexing circuit associated with a receiver twice. When the receivers are distributed on both sides of the central unit, the transmission line may include a section which traverses said central unit directly.

According to another aspect of the present invention, the bipolar code is used for the first pulse signals as well as for the digital information.

As is known, the bipolar code consists of causing each positive pulse to be followed by a negative pulse for transmission on a line so as to avoid the presence of d.c. components. An applciation of the bipolar code to multiplexed seismic transmissions has been described in French Application No. 72,18,138, in which the transmitted element of information includes a positive pulse followed by a negative pulse.

The application of the bipolar code in accordance with the present invention offers numerous advantages, as will appear below.

Thus each first pulse signal preferably includes a first part constituting a violation of bipolarity, followed by a second part constituting a violation of bipolarity in the opposite sense to that of the first part and compensating for it.

After the detection of the first part of the pulse signal a clock source is activated to produce a predetermined number of clock pulses.

A shift register is coupled operatively downstream on the transmission line so that the digital information in the form of pulses in the bipolar code can be applied there.

After the detection of the first part of the pulse signal the predetermined number of clock pulses from the clock source is applied to the shift register.

Preferably, coupling of the shift register downstream of the transmission line is effected after the detection of the second part of the pulse signal, which then serves as an "extraction" instruction for the contents of the register into the transmission line.

A second pulse signal is emitted periodically; it may comprise a first part identical with the first part of the first pulse signals, while the second part also includes a bipolarity in the opposite sense but is otherwise different from the second part of the first pulse signals. These second pulse signals serve as control instructions for digitisation for the various multiplexing circuits; they may thus also define the commencement of the multiplexing cycle.

It is possible to construct other types of pulse signal, also having a first part identical with that of the preceding types and a second part including a violation of bipolarity in the opposite sense, but otherwise different. These signals will, in particular, serve to represent the fact that the digital information which follows them, sent by a multiplexing circuit arranged downstream, should be allowed to pass.

Preferably, the digital seismic information is expressed in the bipolar code as follows: bit ZERO-no pulse; bit ONE-a pulse of alternating positive or negative polarity.

BRIEF DESCRIPTION OF THE DRAWINGS

Other characteristics and advantages of the invention will become apparent from the following detailed description with reference to the accompanying drawings, given as non-limiting examples, in which:

FIG. 4 is a timing diagram illustrating the waveforms of the bipolar code for the transmission of a "word";

FIG. 5 is a timing diagram illustrating the distribution in time of successive words at the various digitising box-receiver assemblies of the transmission line, the transmission circuit being that of FIG. 3;

FIG. 6 is an electrical circuit diagram of another form of the transmission circuit BD23; and FIG. 7 is a timing diagram illustrating the distribution in time of successive words at the level of the various digitiser box-receiver assemblies of the transmission line, the transmission circuit being that of FIG. 6.

DESCRIPTION OF THE PREFERRED EMBODIMENT

Figure 1:
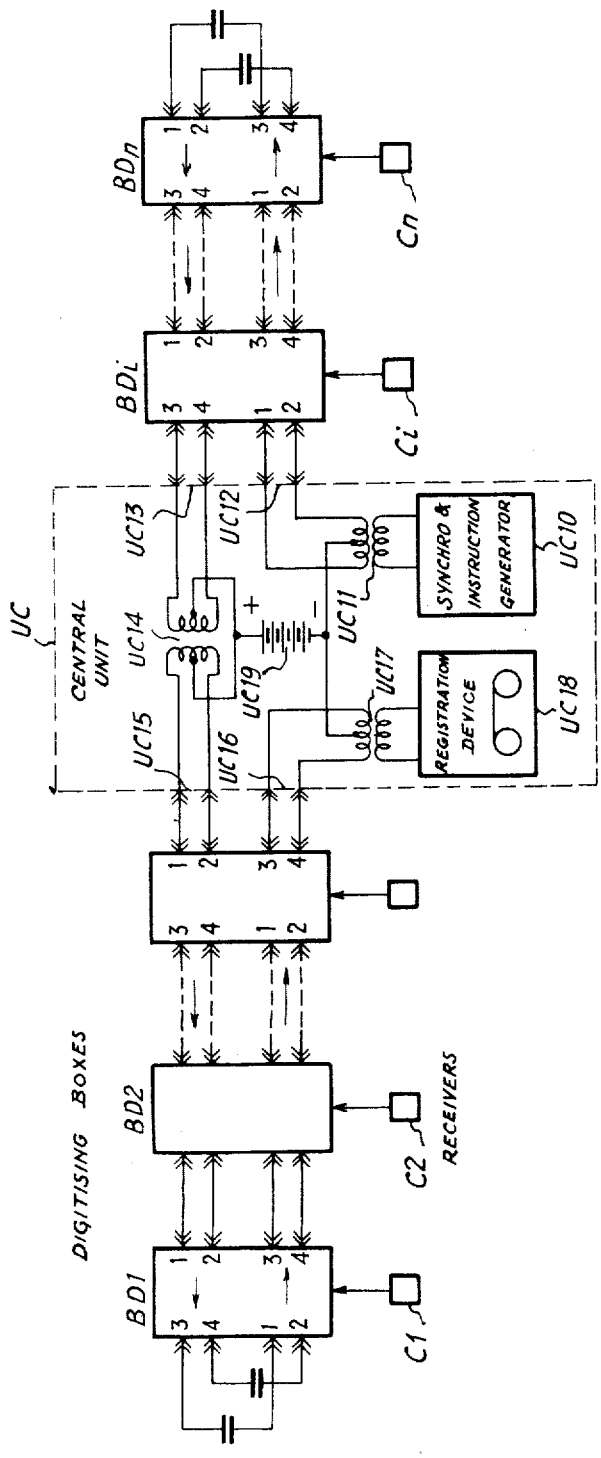
FIG. 1 is a general electrical diagram of a multiplexed transmission line embodying the present invention, forming a loop in the manner described in the aforementioned Application No. 72,18,138 with reference to FIG. 12 thereof.

In FIG. 1, a central unit UC includes a generator UC 10 and a magnetic registration device UC 18. The generator UC 10 is coupled to a bifilar output line UC 12 through a transformer UC 11.

On the other side, a bifilar input line UC 16 is coupled through a transformer UC 17 to the magnetic registration device UC 18.

The central unit also contains another input line UC 13 which is coupled directly through a transformer UC 14 to a bifilar output UC 15.

Towards the right of the central unit, the two bifilar lines UC 12 and UC 13 form a bundle of 4 conductors which is applied in succession to digitising boxes such as BD1 and BD2.

The digitising boxes are counted from the left in FIG. 1 and each is associated with one seismic receiver (one or several geophones) which has the same number, the captor Cn being associated with the digitising box BDn.

As can be seen in FIG. 1, each digitising box is traversed twice by the transmission line, once in its lower part and once in its upper part. Thus, the bifilar line UC 12 enters the box BDi by its inputs 1 and 2, to leave by the outputs 3 and 4 situated at the same level. This is repeated up to the box BDn.

At the latter, the outputs 3 and 4 of the lower part are connected to the inputs 1 and 2 of the upper part by means of condensers. This illustrates the fact that the connection is designed for the transmission of alternating currents, with d.c. potentials being blocked for reasons which will be described below. It is to be understood that these condensers are only a simplified illustration.

The same type of connection as before is again employed from the box BDn back to the box BDi. After the outputs 3 and 4 of the upper part of the box BDi, the line traverses the central unit from UC13 to UC15. Here again there is an a.c. connection suppressing the d.c. potentials.

From UC15, the upper parts of the box are once again coupled as before as far as the box BD1. This latter has a coupling between its upper part and its lower part as in the box BDn.

Finally, the lower parts of the boxes are again connected directly as far as the input UC16 of the central unit.

Thus, the transmission line leaves from the synchronisation and instruction generator UC10, to first traverse the boxes on the right in their lower part, then in their upper part, then the boxes on the left in their upper part and then in their lower part, returning finally to the registration device UC18.

The transformer UC14 has two centre taps connected in common to the positive pole of a d.c. current supply UC19. The secondary of the transformer UC11 and the primary of the transformer UC17 each have a centre tap, said two centre taps being connected in common to the negative pole of the same supply UC19.

In this way, a positive potential is applied in a common manner to the upper part of each box, while a negative potential is applied in common to the lower part of each box. It can now be understood how the condensers described with reference to the boxes BD1 and BDn prevent short-circuiting of this d.c. potential.

This general arrangement of the transmission line in a loop is of the type described in the abovementioned application No. 72,18,138.

Figure 2:
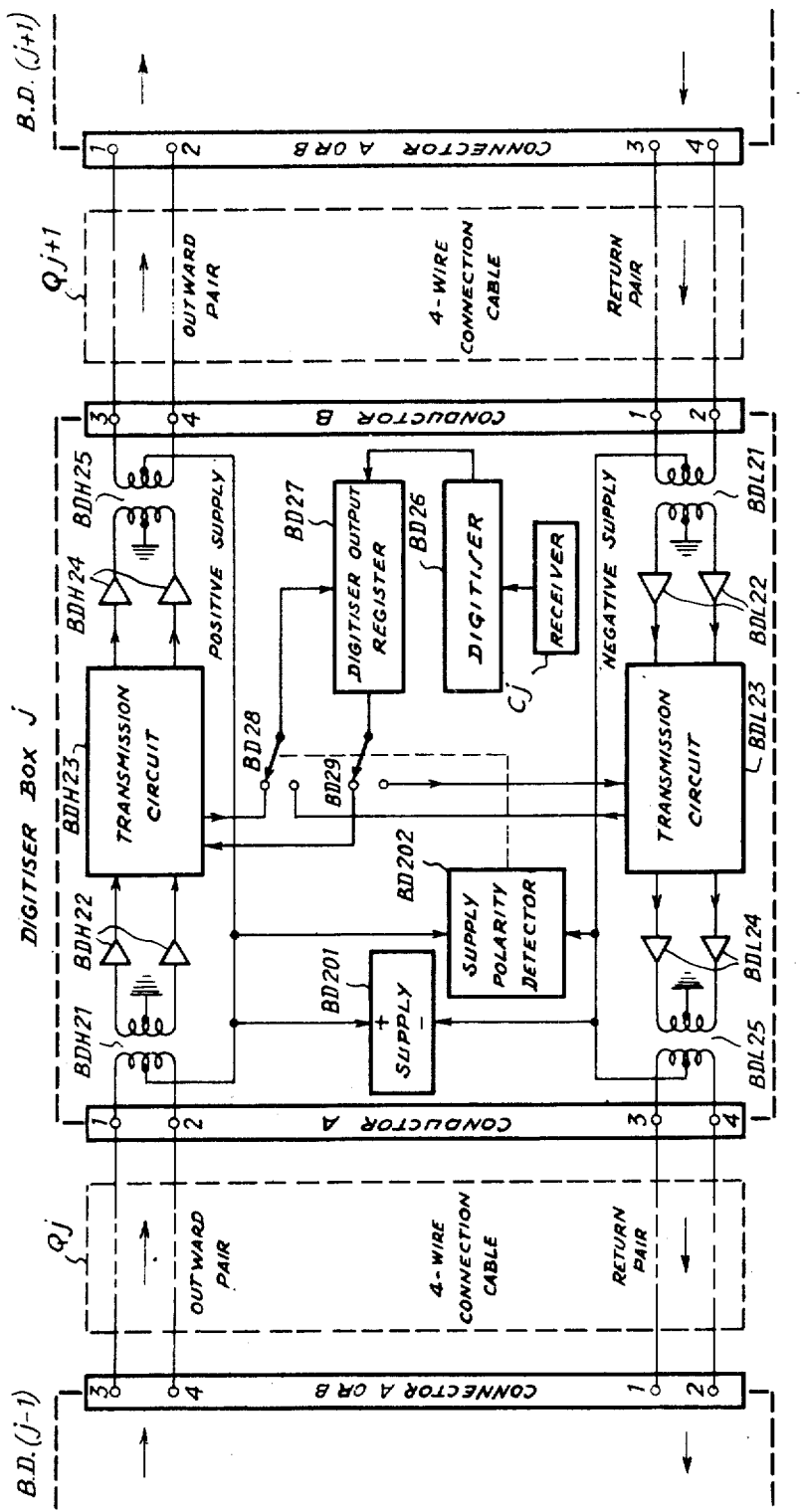
FIG. 2 is a more detailed electrical circuit diagram of a digitising box such as box BDn of FIG. 1.

In FIG. 2, there are illustrated 3 consecutive digitising boxes, which have, respectively, the numbers $j-1$, $j$, and $j+1$. The boxes are all identical and for this reason only the box BDj is illustrated in detail. Each box has two identical connectors A and B. The input of the upper part of the box is connected to the contacts 1 and 2 of the connector A, and its output is connected to the contacts 3 and 4 of the connector B. The input of the lower part of the box is connected to the contacts 1 and 2 of the connector B and its output is connected to the contracts 3 and 4 of the connector A.

The cables with two pairs such as $Qj$ and $Qj + 1$, are also fitted with connectors and the pairs are connected to these connectors in such a way that they cross each other, each pair connecting the contacts 1 and 2 of the connectors to the contacts 3 and 4 of the connector fixed to the other extremity.

In each digitising box, there is an upper part and a lower part, as has been stated above. These parts are identical and the elements of the upper part are denoted by the letters BDH and those of the lower part by the letters BDL. There are also common parts in each box, comprising essentially the digitiser and its output register.

In FIG. 2, the box BDj includes, as well as the inputs 1 and 2 of the connector A, a transformer BDH21, the windings of which have centre taps, that of the secondary being earthed. The two ends of the secondary windings are, respectively, coupled through two amplifiers BDH22 to a transmission circuit BDH23, a detailed example of said circuit being given in FIG. 3. The two outputs of the transmission circuit BDH23 are applied respectively to two amplifiers BDH24, which are themselves followed by a transformer BDH25, having windings with a centre tap. The centre tap of the primary is earthed. The two ends of the secondary of the transformer BDH25 are connected, respectively, to the contacts 3 and 4 of the connector B of the box BDj.

The centre tap of the primary winding of the transformer BDH21 is connected directly to the centre tap of the secondary winding of the transformer BDH25, in order to transmit the positive d.c. potential of the supply which is applied to the line in a common manner.

The lower part of the box BDj includes exactly the same elements which are denoted by the letters BDL rather than BDH.

The centre tap of the primary of the transformer BDH21 and the centre tap of the secondary of the transformer BDH25 are connected, on the one hand, to a circuit BD201, which draws from the d.c. potential in a common manner all the electrical supply for the digitising box, and, on the other hand, to a circuit for the detection of polarity BD202.

In FIG. 2 the receiver Cj is represented as within the interior of the box BDj while, in FIG. 1, it was on the exterior. Preferably, the receiver is, in the material sense, arranged separately.

However, although it has been possible previously to state that the receiver is equipped with means for furnishing its received information in a digital form, it is preferable that said means should be incorporated in the digitising box itself, for simple reasons of current supply and clock signals.

In FIG. 2, the receiver Cj is thus connected to a digitising circuit BD26, supplying its digital information to a register BD27 at the output of the digitiser.

The register BD27 receives clock pulses so as to supply in response its digital information. Two coupled switches BD28 and BD29 allow this exchange of signals to take place either through the transmission circuit BDH23, or through the transmission circuit BDL23. The inverting switches BD28 and BD29 are controlled by the supply polarity detector BD202, which includes, for example, a polarised relay to act on the switches BD28 and BD29 is such a way that the digitiser output register BD27 is connected to the transmission circuit BD23 situated on the positive supply side in a common manner.

Thus, assuming that a sampling control is transmitted on the line, this control traverses all the boxes in order from BDn to BD1. The same will occur for any other control, which will be received by the boxes in the order in which the receivers are positioned on the ground.

Figure 3:
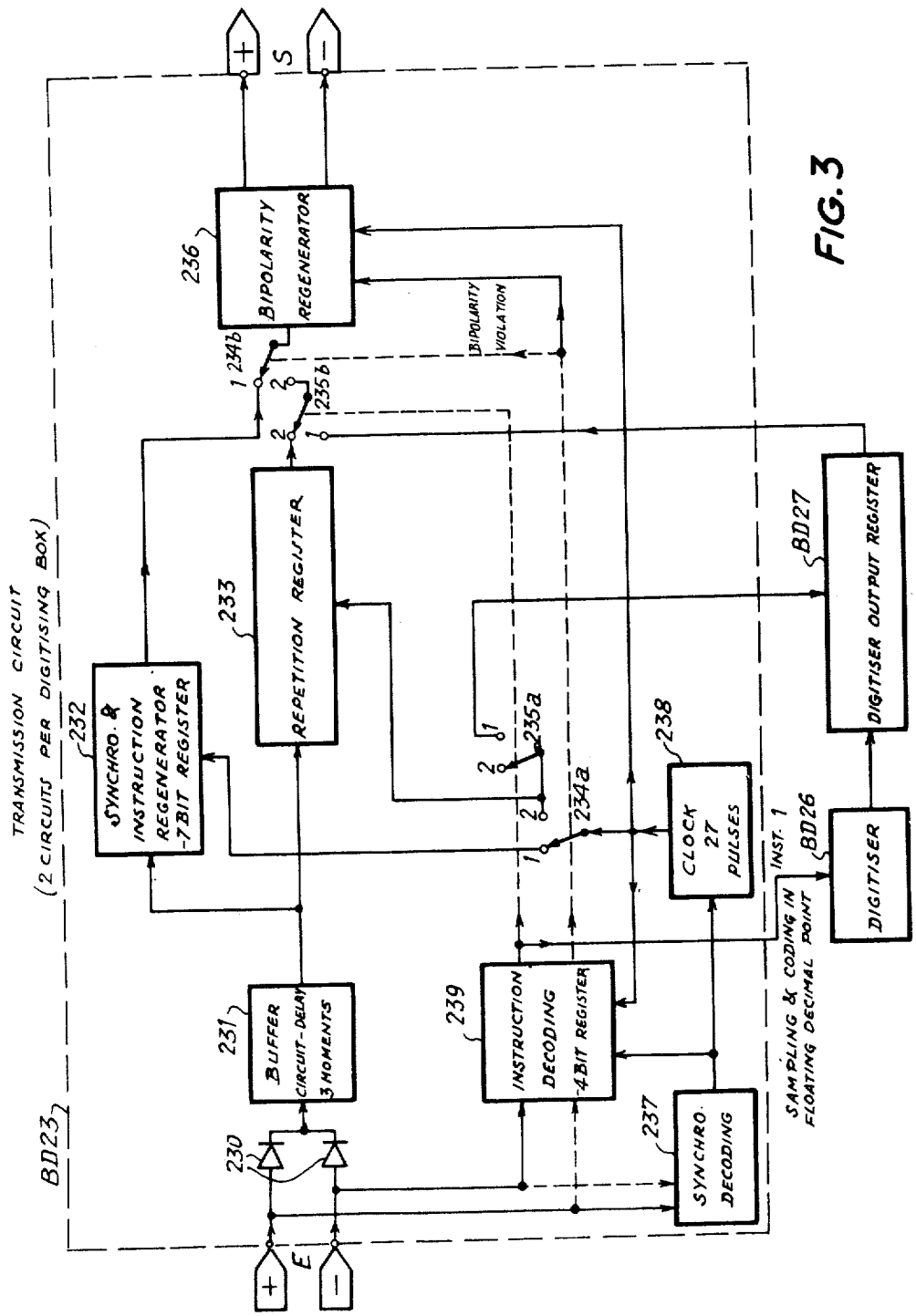
FIG. 3 is a detailed electrical circuit diagram of the transmission circuit BD23 of FIG. 2.

Referring to FIG. 3, we shall now discuss the structure of the transmission circuit in more detail. It will be understood that the structure of the transmission circuits is the essential element defining the mode of operation of the transmission line, taking into account, of course, the signals emitted by the generator.

The synchronisation and instruction generator is capable of supplying pulse signals including:

a synchronisation character, including 3 bits, i.e. 1,0,1, to two binary elements 1 each being represented by a positive pulse, an instruction character of 4 bits, including at least two binary elements 1, each represented by a negative pulse.

The instruction character follows immediately after the synchronisation character and, preferably, the first bit of the instruction character is one of the negative pulses. This has the result that a very abrupt transition is produced at the end of the synchronisation character, the last bit of which is a positive pulse (in principle the pulses completely fill each timing period).

The arrangement of the generator UC10 to produce the pulsed synchronisation and instruction signals as defined above presents no special difficulty, since neither the electric power nor the space required is limited.

On the contrary, the digitising boxes are very important since it is their structure which defines the mode of operation of the transmission line. And it is because of them in particular that it is not possible for either the electrical consumption or the space requirement to be too high without destroying all the advantages of multiplexed transmission. We shall thus describe in detail, with reference to FIG. 3, one of these transmission circuits BD23, such a circuit forming the part of the digitising box essential in the definition of the transmission line.

In FIG. 3, the digitiser BD26 and its register BD27 are also illustrated, assumimg them to be coupled directly to the transmission circuit BD23, the switches BD28 and BD29 not being shown. In the same way, there is shown in circuit connection BD23 to the digitiser BD26, for the "digitisation" control, that is to say analog sampling and coding in floating decimal point in this digitiser.

Relative to this, it should be noted that the digitiser is advantageously similar to that described and claimed in French Application No. 72,00,799, filed on Jan. 11, 1972 by the Société d'Etudes, Recherches de Constructions Electronique — SERCEL, for "Amplifier of analog samples with automatic gain control, and a digitisation circuit with floating decimal point for such samples." (British patent application No. 1221/73).

The capacity of the digitiser register is taken to be 18 bits, representing in floating decimal point the measurement of an analog sample. For example, 3 bits are used to define the binary amplification gain of a sample, while the other bits define the numerical value of the same sample after that amplification.

In FIG. 3, the transmission circuit BD23 includes first of all means intended to connect its input to its output, in order to ensure continuity of the transmission line.

The two input conductors are coupled by two diodes 230, poled in the same sense, on said means to ensure continuity of the line. Since the earth is defined by the centre tap of the transformer BDH21 (FIG. 2) these two diodes rectify the bipolar pulses to the same sense.

The diodes 230 are first of all coupled to a buffer circuit 231, which includes a delay line, to delay by 3 moments the information arriving in the circuit BD23. (The term "binary moment" is given to the time interval of the clock during which a pulse signifying one bit 0 or 1 is transmitted). The output of the buffer circuit 231 is connected on the one hand to a circuit 232, which regenerates the synchronisation and instruction signals, and to a repetition register 233, the capacity of which is at least equal to that of the output register of the digitiser BD27.

Through switches 234b and 235b, an output circuit 236 termed "bipolarity regenerator" receives the input signals arising either from the circuit 232 which is the vehicle for the synchronisation and instruction signals, or from the repetition register 233, or from the output register of the digitiser BD27.

The circuit 236 translates the input information which it receives into information in alternated bipolar code; for the bits ZERO it does not transmit any pulse, and for successive bits ONE, it transmits for each bit ONE a pulse, alternately on one or other of these output lines, thus producing the transmission in bipolar code.

If we now consider afresh the signal emitted by the generator UC10, it will be noted that this signal includes a first part, termed the synchronisation part, which constitutes a positive violation of bipolarity, since two positive pulses succeed each other. Their second part, termed the instruction part, includes among 4 bits 2 negative pulses, forming a negative violation of bipolarity compensating the positive violation of bipolarity of the first, synchronisation part.

This is better illustrated in FIG. 4, where the first 7 bits constitute a pulse signal such as is emitted by the generator UC10 and regenerated by each of the transmission circuits BD23.

The second part, or the instruction for each pulse signal, can be emitted by the generator in several different forms, thus producing instructions of different types.

In FIG. 4, the instruction part is of the form 1,1,0,0. Other instructions can be coded, for example in the form 1,0,1,0 and 1,0,0,1. The 4 bits would, naturally, allow for a greater number of instructions if the necessity of starting with a bit ONE were eliminated; this necessity has been discussed above and has as its object to increase the abruptness of the transition between the synchronisation part and the instruction part.

Two different instructions are used for the transmission circuit of FIG. 3:

INSTRUCTION 1: this instruction causes, on the one hand, the extraction of data stored in the output register of the digitiser of each box and, on the other hand, the commencement of the digitisation operation following the analog sampling and of analog-to-ditital conversion with floating decimal point; this commencement being, in fact, the analog sampling.

INSTRUCTION 2: this instruction causes the transmission of data along the line, causing them to propagate by a global shift along the whole transmission line from each repetition register to the following one.

In each multiplexing sequence, the generator UC10 emits the "synchronisation character" part at least n times. The first synchronisation character is followed by a second part INSTRUCTION 1; all the others are followed by a second part INSTRUCTION 2.

It is possible to use, as a variant, a third instruction, which would merely be a digitisation instruction, while instruction 1 would correspond only to the extraction of data stored in the output registers of the digitisers. In this case, the third instruction would first be emitted at the beginning of the sequence, preceded by the synchronisation character.

Returning to the transmission circuit illustrated in FIG. 3, operating with these two instructions, we will now describe the decoding and the use of the synchronisation character, and of instruction characters of type 1 or type 2.

Of the two input conductors of the bifilar line reaching the input of the circuit BD23, one corresponds to positive polarity of the pulses of the bipolar code. By convention, in what follows in the present description, we will assume that in the FIGS. this is the upper conductor.

This upper conductor is also connected to a decoding circuit for the synchronisation character 237. Although this character only includes two positive pulses it may be advantageous to use the energy arriving at the input of the circuit to the best advantage. The other input conductor is thus also connected to the circuit 237 for decoding the synchronisation character, which is illustrated by a conductor shown in the dashed line in FIG. 3.

Decoding of the synchronisation character may take place in a classical manner by the detection of a positive violation of bipolarity. For example, the first positive pulse is stored and if another arrives after a "hollow", the synchronisation character is taken to have been "received".

Having thus recognised the synchronisation character, the circuit 237 supplies an output signal at the moment of the abrupt transition from the synchronisation character to the instruction character.

Thus this transition is applied simultaneously to activate a clock pulse source 238 and a circuit for decoding instructions 239. In response, at the output of the synchro decoding circuit 237, the clock source 238 supplies 27 clock pulses, that is 27 binary moments, the first 7 of which will be applied to the synchronisation and instruction regenerator circuit 232, and the others concern the measurement information transmitted, in 18 bits, followed by one parity bit and one symmetry bit.

At the same time, the output transition of the synchro decoding circuit 237 is applied to an instruction decoding circuit 239 to activate its operation.

The instruction decoding circuit 239 also receives at least the lower input conductor of the bifilar line and preferably both conductors.

This circuit 239 is advantageously formed of a shift register receiving the first seven clock pulses emitted by the clock source 238. A simple decoding of the binary cells of the registers after the fourth clock pulse then allows identification of instruction 1 or 2.

From the first to the seventh clock pulse, the switch 234a and 234b is in the position 1, that is to say that it is circuit 232 which receives the clock pulses and the output of which is connected to the bipolarity regenerator circuit 236.

This circuit 232 may be a 7 bit shift register, instructed to amplify the synchronisation and instruction signals as they are supplied to it by the output of the buffer circuit 231.

A variant of the embodiment of the circuit 232 will consist in precharging the register with the synchronisation character and in then charging it in parallel with the instruction character immediately after its identification in the circuit 239. It may be remarked that this variant allows easy modification of the instruction character which may prove necessary in certain applications.

When the switches 234a and 234b are in the position 1, a signal is applied to the bipolarity regenerator circuit 236, authorising said circuit 236 to transmit, during this time, two violations of bipolarity, the first positive and the following negative.

After the seventh clock pulse, the switches 234a and 234b pass into the position 2. Decoding of the instructions has already been completed after the end of the fourth clock pulse. After this decoding the switches 235a and 235b are put into the position 1 or 2 according to whether instruction 1 or instruction 2 is operative.

Thus, for instruction 2, only the register 233 will receive the clock pulses and will have its output connected to the bipolarity regenerator circuit 236.

In this case, the transmission circuit operates as a shift register, by means of the register 233, with a delay of 3 binary moments introduced by the buffer circuits 231 and, of course, the delay due to propagation in the line.

Thus, when the global functioning of the transmission circuit BD23 is considered, the synchronisation and instruction characters are transmitted directly and without alteration after having undergone the delay due to the buffer circuit 231.

The digital information which follows undergoes not only the delay due to the buffer circuit 231, as has already been described in the abovementioned Application No. 72,18,138, but also storing in the repetition register 233.

In the case of instruction 1, the switches 235a and 235b are in the position 1 and the registers 233 and BD27 receive the clock pulses simultaneously, but it is the output of the register BD27 which is coupled to the bipolarity regenerator 236. At the same time or a little after, the digitiser BD26 receives the order to commence a new operation of analog sampling and coding in floating decimal point.

This INSTRUCTION 1 thus has as its consequence that the contents of the digitiser register BD27 are sent on the transmission line towards the repetition register 233 of the next following box downstream, while the repetition register 233 of the box under discussion receives the contents of the digitiser register of the preceding box upstream.

When it is the digitiser output register BD27 which is coupled to the transmission line in the downstream direction, the circuit 236 produces bipolarity as usual, adding also one symmetry bit, as will be seen in the following.

In order to produce bipolarity, the circuit 236 may include solely a counter of the bits ONE which are applied to it and a commutator to apply these bits ONE alternately to the upper conductor (bipolarity positive) and to the lower conductor (bipolarity negative).

FIG. 4 illustrates an example of a word transmitted thus by the circuit 236 in response to the circuits 232 and 233 or BD27. In fact, up to the present only the first 26 bits of the word illustrated in FIG. 4 have been considered. The twenty seventh is a symmetry bit, with is normally ZERO, since the total of the first 26 bits normally includes as many positive bits ONE as negative bits ONE.

When the circuit 236 detects a positive or negative anomaly, it can add a symmetry bit in the sense suitable to correct that anomaly. For these operations, the circuit 236 of course receives the 27 clock pulses supplied by the source 238.

In FIG. 5 the succession of responses of the digitising boxes starting from the box BDn of FIG. 1 are shown. Only in the input signal of each box is illustrated with the clock signal, it being understood that the output of one box is the input of the following box, with, of course, a propagation delay which is neglected in FIG. 5.

The box BDn thus first receives a synchronisation character (SYNC) followed by a character INSTRUCTION 1 (INST. 1).

After the character SYNC has been decoded, the clock is put into action with a shift of a half period of the clock time which facilitates the establishment of the logical states necessary before transfer to the box BD23. The delay is then 3½ clock pulses.

In response to these 27 clock pulses, the following box BDn − 1, receives the characters SYNC and INST 1, regenerated during the first 7 pulses of the clock of the box BDn, followed by the 18 measurement bits coming from the output register BD27 of the digitiser of the box BDn, then by the parity bit and by the symmetry bit.

During this time, but with a delay of a little more than 3½ clock pulses, the digitising box BDn − 1 transmits its measurements, in the form of a word of the same type, in the direction of the digitising box BDn − 2, which proceeds in the same way but with an approximately double delay, and so on as follows.

It is thus possible to consider that the analog sampling and the coding in floating decimal point, which are both made in response to the instruction 1, at the same time as the previously measured information is dispatched on the line (extraction), are practically simultaneous for all the digitising boxes.

In response to the second group, SYNC., INST 2, the digitising box BDn sends the contents of its register 233 to the repetition register, which contains the measurements coming from the box BDn, towards the register 233 of the box BDn − 2, with a delay approximately equal to 3½ clock pulses as before, the shift is produced in an analogous manner for the following boxes, a shift of 3½ clock pulses being added on each occasion.

After the nth synchro-instruction group, which is of the type SYNC., INST. 2, the measurements of the box BDn arrive at the output of the upper part of the box BD1, that is to say they re-enter into the lower part of this box in FIG. 1.

All the lower parts of the boxes serve solely as repeaters, since they are not connected to the output register of the digitiser of the box (see FIG. 2). In other words, when they receive the instruction 1, the lower parts of the various digitising boxes will send an empty word, insofar as digital information is concerned. They will then react by shifting the 28 bit word towards the registration device UC18, as do the upper parts of the digitising boxes.

The generator UC10 should then send groups SYNC., INST. 2 up to the time at which the *n* consecutive and non-empty multiplex words have arrived at the registration device UC18 (up to a maximum of 2*n* groups in all).

This registration device UC18 thus first receives the group SYNC., INST. 1, then a certain number of groups SYNC., INST. 2 all accompanied by empty words emitted by the lower parts of the boxes situated on the left in FIG. 1. Subsequently, the *n* consecutive multiplex words arrive, each preceded by groups SYNC., INST. 2.

We will now describe various variants.

A first variant will consist in combining in one register only the elements BD27 and 233 of FIG. 3.

In this case, instead of charging a repetition register of the following box for the extraction operation, the output of the digitiser BD26 charges one of the two repetition registers 233 of the local box (normally that of the upper part of the digitising box).

This variant suffers from the fact that digitisation must be carried out at the same clock pulse rate as multiplexing.

Another form of this variant consists in keeping the output register of the digitiser BD27 in an individual form and injecting its output singal into the register 233 of the local box, instead of that of the following box. This will have the advantage of simplifying the circuit a little by eliminating commutation by the switch 235*b*.

In a particular embodiment of the invention the synchronisation characters have a spacing of 8 microseconds between them. The multiplexing cycle then lasts n times 8 microseconds, that is to say, for example, approximately 2 milliseconds for 250 receivers and digitising boxes. The duration of clock interval is of the order of 0.3 microseconds.

We will now consider in more detail the application of bipolar coding which is made in this case.

The generator UC10 of FIG. 1 emits pulse signals which are constituted by a first part forming a positive bipolarity violation, followed immediately by a second part forming a negative bipolarity violation compensating the positive polarity violation.

The first part, or synchronisation character, is common to all the different types of pulse signal which the generator UC10 is able to emit.

On the other hand, the second part distinguishes several different types of pulse signal; this second part is the instruction character mentioned previously.

At each digitising box, after the detection of the first part of every pulse signal, that is to say, after the detection of the synchronisation character, a clock source is excited to give a predetermined number of clock pulses which will cause active operation of the digitising box.

This has the result that a delay of duration at least equal to that of the synchronisation character is produced at each digitising box.

The first pulse signals (SYNC., INST. 1) result in, on the one hand, the activation of a clock and, on the other hand, the coupling of the output register of the digitiser BD27 downstream; this coupling being made in response to the second part of the first pulse signal, that is to say, in response to the instruction character.

The second pulse signals (SYNC. INST. 2) result, pure and simply, in the transmission of multiplexed words along the transmission line. In the embodiment described above, this straightforward transmission is carried out by the intermediary of the repetition register 233, included in each of the two transmission circuits belonging to one digitising box.

As has been described in detail above, third pulse signals may be emitted at the beginning of each multiplexing cycle, if it is desired to separate the digitisation function or sampling and coding in floating decimal point, which concerns the digitiser BD26 itself, from the function of the extraction of digital information, which concerns the output register of the digitise BD27.

In the abovementioned Application No. 72,18,138 there is described a system for the multiplexed transmission of the signals from seismic receivers in which each multiplexing circuit or digitising box includes as a series element in the transmission line means to suppress at least a part of the first pulse signals, in other words the digital information is transmitted directly, that is to say with, where necessary, a delay, but without modification; on the other hand, the first pulse signals are either denatured, that is to say altered so as to change their significance, or else are suppressed completely and, if necessary, replaced by other signals.

On the contrary, in a multiplexing circuit (or digitising box) which includes transmission circuits of the type illustrated in FIG. 3, the pulse signals (SYNC., INST 1 or 2 or others) are transmitted directly, that is to say without alteration but, if necessary, with a delay. For their part, the digital information which accompanies each pulse signal or synchro-instruction group is subjected to the same delay and is, in addition, arrested and stored, to be transmitted with the following synchro-instruction group If we consider afresh the arrangements described in French Application No. 72,18,138, the bipolar code of the invention can be applied in the following manner, with three types of pulse signal which have the same first part, or synchro group, and different second parts or instruction groups.

In the most general application, three instructions are used:

one instruction E (extraction), to initiate the passage of digital information from the output register of the digitising box downstream into the transmission line.

one instruction E' to initiate the pure and simple transmission of information from the transmission line through the digitising box in question, and one instruction N (digitisation) to initiate the sampling and coding with floating decimal point in the digitiser.

The group SYNC., INST.E forms a first pulse signal; the group SYNC., INST.E' forms a modified first pulse signal, and the group SYNC., INST.N forms a second pulse signal.

The generator corresponding to UC10 then emits a second pulse signal, which will simultaneously produce digitisation in all the digitising boxes, followed by a number n of the first pulse signals.

When it receives a first pulse signal such as is emitted by the generator, that is non-modified, a digitising box will then alter this to change it to a modified first pulse signal, to which the following digitised boxes, downstream on the transmission line, will not respond.

Immediately after the first pulse signal which it has modified, the digitising box introduces the information from its digitiser output register, which brings about the extraction operation.

Thus, as is described in French Application No. 72,18,138, the digitisation operation is first released for all the digitising boxes, in response to the "second pulse signal", which is emitted first of all by the generator. Afterwards, the first digitising box supplies its digital information in response to the "first pulse signal" at the head, meanwhile having modified this first pulse signal so that it is unrecognisable for the boxes following downstream.

The second digitising box then allows this modified pulse signal, with the digital information which follows it, to pass; it responds to the second first pulse signal by modifying this signal, while retransmitting it downstream followed by digital information from its digitiser output register, and so on for the other boxes.

Each digitising box also includes an extraction memory, which is reset to zero each time a new digitisation operation is carried out. Such a memory is described in French Application No. 72,18,138.

An embodiment of this type is illustrated in FIG. 6.

A decoding synchro circuit 637 is again found, controlling a clock 638A cooperating with a counter 638B to supply 27 clock pulses (taking into account the shift of ½ a clock interval). "Instruction" decoding is carried out by a register 639A followed by a decoder 639B, having an "instruction N" output and an "instruction E" output.

The instruction N output controls sampling in the digitiser BD26A.

The instruction E output acts on two clocks BD26B, one of which is slow in order to introduce the data of the digitiser BD26A (including the parity bit) into the registers BD27A and BD27B through a polarity selector BD27C, and the other is fast in order to extract the information from the registers BD27A and BD27B.

In the presence of instruction E, the rapid clock is applied to the registers BD27A and BD27B, and these registers are coupled to the transmission line, by movement of the switches 635 into the lower position.

A memory 639C registers the first instruction E arriving after the instruction N and forbids any new coding of instruction E until the next instruction N.

The instruction E is not decoded and the word which contains it simply traverses the buffer register during the 27 clock pulses.

The form of the instruction characters N, E and E' appears in FIG. 7. The instructions N and E are produced by the generator. The subscript associated with an instruction E' indicates the number of the box which has modified an instruction E so as to produce this instruction E', in order to simplify understanding.

Before or during the synchro decoding in circuit 637, the synchro character (1,0,1 with bits 1 positive) is entered into the register 631A. It will then be transmitted downstream in response to the first 3 of the 27 clock pulses.

The instruction character, whatever it may be, is regenerated in its passage through the buffer registers 631A and 631B. Nevertheless, when an instruction 2 is decoded, these two last positive pulses are inhibited from giving an instruction E' downstream. This can be brought about at the registers 631A and 631B or, again, by closing the switches 640.

In FIG. 7, it can be seen how each box introduces digital information immediately after having transformed an E instruction into an instruction E'. It will be noted that the instruction E' is not an order but a "permit to pass".

Finally, in FIG. 6, two switches 636 will permit the roles of the positive and negative conductors of the transmission line to be inverted during the passage of the 19 digital information bits (18 bits, plus one parity bit).

For this purpose, these switches are in the upper position from the first to the seventh clock intervals, and in the lower position from the eighth to the twenty-eighth clock intervals. This "alternation" of the digital information bits, properly so-called, reduces the "jig" or "jitter", that is to say the individual variations in the temporal position of the bits along the transmission line.

What is claimed is:

1. A system for the multiplexed transmission of signals from seismic sensors including a transmission line extending between a generator of first pulse signals and a registration station for seismic signals, each sensor being coupled to the line by means of a multiplexing circuit connected in series in the line, wherein the generator is arranged to supply first pulse signals including a first part followed by a second part, the two parts constituting, respectively, two violations of bipolarity in the opposite sense and compensating each other, each sensor is adapted to supply information in a digital form, and each multiplexing circuit includes at least one shift register adapted, on the one hand to be filled with said digital information and, on the other hand, to be operatively coupled to the transmission line downstream in order to apply to the line digital information in the form of pulses in bipolar code, and means responsive to the first part of the first pulse signals by activating a clock pulse source to apply a predetermined number of clock pulses to the shift register.

2. A system according to claim 1, wherein each multiplexing circuit includes means for coupling said shift register downstream in the transmission line in response to the second part of the first pulse signal.

3. A system according to claim 1, wherein each multiplexing circuit includes delay means in series in the line, both for the pulse signals and for the digital information, the delay being at least equal to the duration of the said first part of the first pulse signal.

4. A system according to claim 3, wherein each multiplexing circuit also includes means for the regeneration of the first pluse signals with the same delay, at least equal to the duration of the first part of these signals.

5. A system according to claim 1, wherein each multiplexing circuit is coupled to the transmission line downstream by a circuit which regenerates bipolarity, which is adapted to transmit alternatively positive and negative pulses in response to successive bits having a predetermined level either ONE or ZERO.

6. A system according to claim 1, wherein digitization means is provided in the sensor and wherein the generator is adapted to produce second pulse signals having the same first part as the first pulse signals and a different second part, constituting a bipolarity violation compensating that of the first part, each multiplexing circuit responding to a second pulse signal by activating the digitization means provided in the sensor.

7. A system according to claim 6, wherein the generator is arranged to produce third pulse signals, again having the same first part and a second part different from that of the first pulse signals, with a bipolarity violation compensating that of the first part, each multiplexing circuit being responsive to said third pulse signal to transmit the pulse signals and digital information from upstream towards downstream of the transmission line.

8. A system according to claim 6, wherein each multiplexing circuit includes means for altering the first pulse signal which it receives after a second pulse signal, in such a way that it becomes a third pulse signal unrecognizable by the multiplexing circuits following downstream.

9. A system according to claim 1, wherein said first part includes three bits, the two extreme bits being two pulses of the same polarity, and the second part includes four bits, the first bit being a pulse of opposite polarity and the same as that of at least one of the following three bits.

10. A system according to claim 1, wherein the transmission line forms a loop starting from a central unit, passing through each multiplexing circuit twice with input and output couplings through transformers, and passing similarly once through the central unit, centre taps on the transformers ensuring continuity for a d.c. supply potential difference in a common manner, coming from the central unit on both sides of two points of interruption of continuous current, each multiplexing circuit including means for switching its digital information towards a predetermined polarity of the common potential difference.

11. A system for the multiplexed transmission of information signals from a plurality of sensors, including a transmission line extending outwardly from a generator of first pulse signals and returning to a recording station for the information signals, each sensor being coupled to the transmission line by means of a respective multiplexing circuit connected in series in the line, said first pulse signals comprising synchronization signals which precede said informarion signals in time, wherein
each sensor is adapted to supply information in a digital form, and
each multiplexing circuit includes:
at least one first shift register adapted to be filled with digital information and coupled in series in the transmission line in order to receive from the line upstream and transmit to the line downstream digital information in the form of successive coded pulses,
means for detecting the first pulse signals, coupled upstream of the transmission line.
means adapted to apply clock pulses to said first shift register after each detection of a first pulse signal to cause admission of data into said first shift register from the line upstream and delivery of previously stored data from said shift register into the line downstream of said multiplexing circuit, and
means for allowing the first pulse signals to pass through the multiplexing circuit from its upstream side to the line on its downstream side, before the starting of delivery of data by said first shift register on the line downstream.

12. A system according to claim 11, wherein in each multiplexing circuit, the means for applying clock pulses to said first shift register include a clock pulse source and means responsive to the detection of the first pulse signal to cause a predetermined number of clock pulses to be applied from said source to said first shift register.

13. The system according to claim 11, wherein said transmission line forms a loop and said transmission line passes through each multiplexing circuit at least twice, digital information being supplied to the line by a sensor at each point where said line passes through the respective multiplexing circuit associated therewith.

14. A system for the multiplexted transmission of information signals from sensors, including a transmission line extending between a generator of first pulse signals and a recording station for the information signals, each sensor being coupled to the transmission line by means of a respective multiplexing circuit connected in series in the line, wherein
said generator is arranged to produce a second pulse signal from time to time, said second pulse signal being different from the first pulse signals defining the start of a multiplexing cycle, followed by a number of first pulse signals at least equal to the number of multiplexing circuits in series in the line, and wherein each multiplexing circuit includes means for detecting the second pluse signal,
each sensor is adapted to supply information in a digital form, and
each multiplexing circuit includes:
at least one first shift register adapted to be filled with digital information and coupled in series in the transmission line in order to receive from the line upstream and transmit to the line dowstream digital information in the form of successive coded pulses,
means for detecting the first pulse signals, coupled upstream of the transmission line,
means adapted to apply clock pulses to said first shift register after each detection of a first pulse signal to cause admission of data into said first shift register from the line upstream and delivery of previously stored data from said shift register into the line downstream of said multiplexing circuit, and
means for allowing the first pulse signals to pass through the multiplexing circuit from its upstream side to the line on its downstream side, before the starting of delivery of data by said first shift register on the line downstream.

15. A system according to claim 14, wherein each multiplexing circuit includes means for causing the digital information from the sensor to enter said first shift register after the detection of the second pluse signal.

16. A system according to claim 14, wherein each multiplexing circuit includes at least one second shift register to store the digital information from the sensor and means responsive to the detection of the second pulse signal for applying to said second shift register a predetermined number of clock pulses and for operatively coupling said second shift register to the line downstream, in order to apply to the line the digital information of said multiplexing circuit in the form of successively coded pulses.

17. A system according to claim 16, wherein the means responsive to the detection of the second pulse signal also initiates the introduction into said second shift register of new digital information from the sensor.

18. A system according to claim 13, wherein in each multiplexing circuit, the means for allowing the first pulse signals to pass from the upstream side to the downstream side of said multiplexing circuit include a delay device. c 19. A system according to claim 18, wherein the delay device is a buffer circuit.

20. A system according to claim 16, wherein the generator and the recording station are combined in a central unit, the transmission line forming a loop, and wherein each multiplexing circuit includes a third shift register and means responsive to the pulse signals to apply a predetermined number of clock pulses to said third shift register.

* * * * *